(12) United States Patent
Baldwin

(10) Patent No.: X9010
(45) Date of Patent: Aug. 17, 1835

(54) STEAM ENGINE, LOCOMOTIVE WHEELS, & BOILER TUBES FOR

(76) Inventor: Matthias W. Baldwin

Matthias W. Baldwin of Philadelphia
Letters Patent

The Schedule referred to in these Letters Patent and making part
of the same containing a description in the words of the said Mat-
thias W Baldwin himself of his improvement in the mode of
fitting the boxes for gudgeons into plummer blocks, and also the
bearing of the slides for Locomotive and other Steam Engines
and for other purposes.

---

To all whom it may concern. Be it Known that I Matthi
as W. Baldwin, machinist of the City of the City of Philadel
phia, in the State of Pennsylvania have invented a new and
improved mode of fitting the boxes within which gudgeons
are to run. into plummer blocks. and also of fitting and ad-
justing the bearing of slides. or guides for piston Rods. Which inven
tions are applicable to Locomotive Engines. and also to other purposes, and
I do hereby declare that the following is a full and exact descrip
tion thereof. The boxes in which the gudgeons used about Locomotive
and other Steam Engines. and machinery of various kinds are received
and turn have heretofore been fitted into the plummer Blocks. or pedes
tals made to receive them by filing. or other analogous means. their ends
being made either square or angular and adapted to corresponding
parts, in the plummer block or pedestal prepared to receive them,
My improved mode of fitting them consists in turning, or boring
the opening or seat in the plummer block into which the boxes are
to be fitted. so as to make each of the cheeks cylindrical segments
The boxes in which the gudgeon is to run are then to be attach
ed to each other by screws. or otherwise and turned by means of a
slide rest or worked in any other manner so as to make their ends
cylindrical, and to cause them to fit exactly to the cylindrical cheeks
prepared for their reception in the plummer block. In constructing
the slides for the pistons of Locomotive, and other Steam Engines, and for other purposes. the slide bar has usually been made square, or four sided, and its angles usually right angles, and the brasses or bearings contained the box within which it slides have been adjusted to it by set screws operating upon two sides thereof. In my improved mode of construction the adjustment is made to operate upon the sides or edges only. For this purpose I make my slide bar flat on two sides, and the other two sides or edges have round. or otherwise form them into two planes. meeting each other along the middle thereof by which means the rod will become six sided. this latter form being preferred to the rounding of the edges. The box within which the bar slides is provided with two brasses or bearing pieces with hollows or grooves in them adapted to the edges of the sliding bar; and fitting accurately between the parallel sides of the Box. when therefore the brasses or bearings are adjusted to the edges of the rods by set screws acting against them; the rod is embraced by them so as effectually to check all tendency to a lateral motion as will clearly appear by an inspection of the drawings deposited in the Patent Office

What I claim as my Invention and wish to secure by Letters Patent, is the mode of fitting the boxes of gudgeons into plummer blocks, pedestals, or other receptacles, by boring, turning, or otherwise so as to make the fittings cylindrical. I also claim the fitting of the slides for the pistons of Locomotive Engines and for other purposes into brasses or boxes adjusted and operating, in the manner herein before set forth.

Witnesses
A. Pettit }
John Hall }

M. W. Baldwin

Exd (Patented Aug. 17th 1835)

IHT

[illegible]